United States Patent [19]

Prible

[11] 4,237,103

[45] Dec. 2, 1980

[54] METHOD FOR DISPOSAL OF SODIUM WASTE MATERIAL

[75] Inventor: Glen V. Prible, Malvern, Pa.

[73] Assignee: Combustion Engineering, Inc., Windsor, Conn.

[21] Appl. No.: 920,394

[22] Filed: Jun. 29, 1978

[51] Int. Cl.³ .............................................. C01B 33/32
[52] U.S. Cl. .................................. 423/207; 110/342; 110/343; 162/31; 423/334; 423/DIG. 3
[58] Field of Search ............... 423/207, 332, 334, 179, 423/DIG. 3; 162/31; 110/342, 343, 346; 431/2

[56] References Cited

U.S. PATENT DOCUMENTS

| | | | |
|---|---|---|---|
| 1,771,829 | 7/1930 | Wagner | 423/207 X |
| 1,808,773 | 6/1931 | Growdowa | 423/207 |
| 2,352,738 | 7/1944 | Ruthrugg | 423/334 |
| 3,333,917 | 8/1967 | Bergholm | 423/207 |
| 3,511,601 | 5/1970 | Bieler et al. | 423/334 |
| 3,978,197 | 8/1976 | Betz | 423/332 |
| 4,049,489 | 9/1977 | Vegeby | 423/207 X |

*Primary Examiner*—Edward J. Meros
*Attorney, Agent, or Firm*—Fishman and Van Kirk

[57] ABSTRACT

A method for disposal of sodium containing waste material comprising combustion sodium containing waste material and a silica bearing material in an incinerator having interior walls lined with a refractory material which tends to react with metallic sodium and deteriorate. The sodium containing waste material comprises sodium salt and/or bases and by providing reaction conditions whereby the metallic sodium tends to react with silica to provide a combustion product including a sodium silicate compound, the combustion is carried out in manner to reduce deterioration of refractory materials by reaction with metallic sodium. Also disclosed is a method for the simultaneous disposal of sodium containing waste material and rice hulls which contain silica and provide a portion of the combustion energy.

15 Claims, 2 Drawing Figures

METHOD FOR DISPOSAL OF SODIUM WASTE MATERIAL

BACKGROUND OF THE INVENTION (1) Field of the Invention

This invention relates to a method for disposal of sodium containing waste material. The method has utility in the pulp and paper industry.

(2) Description of the Prior Art

A waste product of the pulp and paper industry, known in the art as black liquor, is discharged from the pulp digestor during the paper making process and contains relatively high concentrations of sodium salts and bases such as, for example, sodium chloride, sodium hydroxide, sodium sulfates and sulfites and sodium carbonates.

A known method for the disposal of sodium containing waste material is to combust the material in various types of incinerators and then dispose of the combustion product. In this disposal method, metallic sodium is released during the combustion and reacts with the refractory materials that line interior portions of many conventional incinerators. The metallic sodium reacts with the refractory material to produce deterioration in the form of spalling, cracking and/or pitting. It is believed that the metallic sodium is attracted to the silica and/or the alumina which are standard composites in refractory material used in incinerators. The thus formed sodium silicates and sodium aluminates have a different density and a different coefficient of expansion than the base refractory material and, upon repeated heating and cooling, the sodium silicates and the sodium aluminates spall resulting in rapid deterioration of the refractory material and necessitating replacement.

One common method of extending the life of refractory material in an incinerator is to coat the surface of the refractory with a silica mortar which is higher in silica content than the base refractory. The silica in the silica mortar reacts preferentially with metallic sodium. This reaction creates a thick glassy phase external to the refractory material. The thick glassy phase serves as a partial barrier to sodium attack on the base refractory. Although this method extends the life of the refractory material, it is not effective in that the refractory material eventually spalls, at least partly because of thermal spalling resulting from cycling, and the refractory coating must be replaced. Another drawback of this method is that the requisite periodic shut-downs to reapply mortar are time consuming and thus expensive. Also, the high concentration silica mortar is expensive.

U.S. Pat. No. 3,537,815 discloses a method for the preparation of alkali metal silicates wherein a mixture of silica and a sodium containing compound is heated to a temperature between 3100° F. and 3900° F. to produce a sodium silicate. The patent discloses that furnace wall deterioration may be a problem. The patent states that the problem can be solved by combusting the mixture essentially out of contact with the furnace walls.

This solution to the problem of wall deterioration suggested in U.S. Pat. No. 3,537,815 is not practical in that it would require extensive redesign of incinerators in order to prevent contact of reactants with incinerator walls. Redesign and modification of installed incinerators would be very difficult. Also, this patent discloses that the reaction is carried out in a modified carbon black furnace but does not disclose that the furnace includes refractory materials which tend to deteriorate when exposed to metallic sodium.

U.S. Pat. No. 3,511,601 discloses a process for densifying rice hulls. This patent discloses that rice hulls, which contain about 20% silica, can be coated with sodium hydroxide and incinerated at a temperature of about 900° C. to about 1500° C. to produce sodium silicate which may be disposed of in a more simple manner than the product of incineration of rice hulls alone. This patent does not disclose the particular type of incinerator used in the process, nor does it disclose any type of problem incurred with deterioration of refractory materials by the reactants present.

Accordingly, it is an object of the present invention to provide a method for disposal of sodium containing waste material which minimizes deterioration of refractory materials used in incinerators and which does not require extensive redesign and modification of existing incinerators.

It is a further object of the present invention to provide a method for the simultaneous disposal of sodium containing waste material and rice hulls.

It is another object of the present invention to reduce the amount of fuel necessary to dispose of the reactants produced during incineration of sodium containing waste material by having one of the reactants provide some of the fuel.

SUMMARY OF THE INVENTION

The present invention provides a method for the disposal of sodium containing waste material wherein sodium containing waste material and silica bearing material are simuntaneously combusted in an incinerator having a portion of the interior exposed walls lined with refractory material which normally tends to react with metallic sodium and deteriorate.

The present invention also provides a method for the simultaneous disposal of sodium containing waste material and rice hulls, which contain silica, wherein the rice hulls provide a portion of the combustion energy.

The present invention allows for the combustion of sodium containing waste material in an incinerator lined with conventional uncoated refractory material and reduces deterioration of the refractory material.

DETAILED DESCRIPTION OF THE INVENTION

Figure 1:
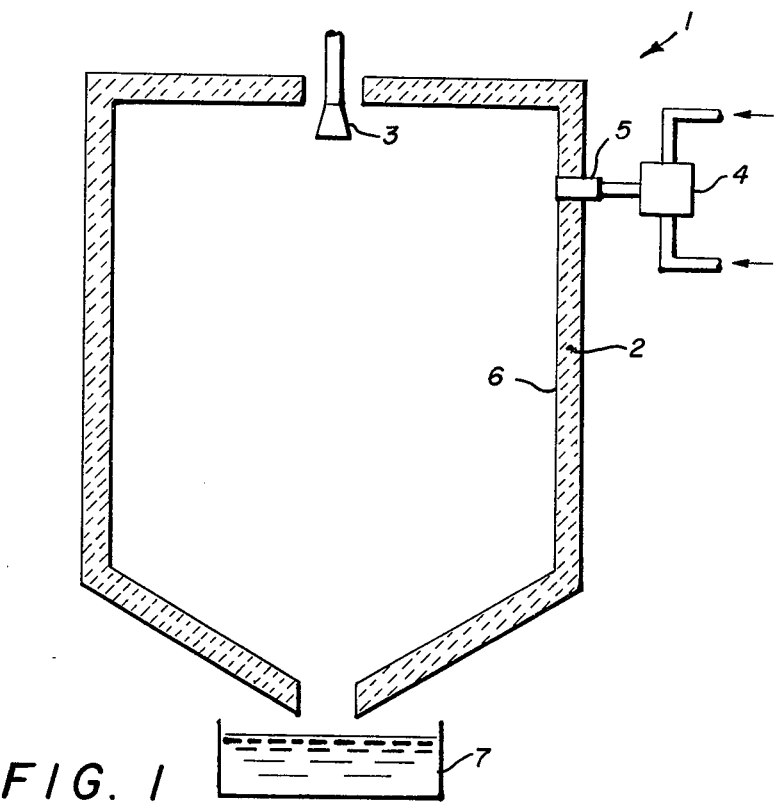
FIG. 1 shows a schematic of an incinerator used in the present invention.

The sodium containing waste material known as "black liquor" comprises an aqueous mixture containing about 1 to about 20 weight percent sodium salts and bases. The remainder of the mixture comprises small amounts of organics and organic chlorides having no sodium and about 70 to about 95 weight percent water. Sodium is in the waste material in the form of sodium salts and bases such as sodium hydroxide, sodium chloride, sodium fluoride, sodium sulfate, sodium sulfite, sodium carbonate and sodium bicarbonate and organic and inorganic compounds containing sodium. More specifically, "black liquor" typically includes:

about 5 to about 15 weight percent NaCl,
traces to about 1 weight percent NaOH,
traces to about 1 weight percent $Na_2SO_4$, traces to about 1 weight percent $Na_2SO_3$,
traces to about 10 weight percent Organics, and
about 75 to about 95 weight percent water The above-listed sodium containing waste materials, when heated to elevated temperatures, provide free sodium which reacts with silica. Free sodium is defined as metallic sodium and/or sodium in a form that will readily react with silica and/or alumina to form a sodium silicate and/or sodium aluminate compounds.

In accordance with the present invention, a silica bearing material, or a mixture of silica bearing materials, is combusted with the sodium containing material. Sources of silica bearing materials include silica flour, silica fume, pulverized silica sand and organic materials containing silica. Such organic materials, in addition to providing silica, can also provide a secondary source of fuel to provide, when combusted, the elevated temperature necessary to combust the sodium containing waste material. One particularly preferred organic material is rice hulls. Rice hulls are a waste product of the rice industry. The hulls are the outer shell portion of the rice grain which is shucked prior to use of the rice grain. Rice hulls comprise about 15–20 weight percent of silica, about 10% water and the remainder of the material comprises organic material such as cellulose. In general rice hulls have an energy content of about 5000 to about 6000 Btu per pound and may thus provide additional energy in the combustion process.

It is preferred that the silica bearing material be mixed with water to provide an aqueous medium for injection into the incinerator. The silica bearing material in dry powdered form may be mixed with the aqueous sodium containing waste material, black liquor for example, to form an aqueous mixture containing the sodium containing waste material and the silica bearing material. This aqueous mixture may then be injected into the incinerator and combusted.

An alternative method for introducing the sodium containing waste material and the silica bearing material into the incinerator is to inject an aqueous sodium containing material separately from an aqueous or dry silica bearing material.

It should be understood that the sodium containing waste material is mixed with the silica bearing material in stoichiometric proportions so that the resulting combustion product includes a sodium silicate compound. Preferably, the weight ratio of sodium to silica (Na/Si) in the mixture should be from about 0.4 Na/Si to about 0.8, preferably from about 0.6 to about 0.75 to provide substantially complete reaction of the sodium containing waste material with the silica bearing material.

The temperature at which the process is carried out is any temperature at which the sodium containing waste material will react with the silica bearing material to produce sodium silicate compounds. Preferably, the temperature of the incinerator should be at least about 650° C. in order for the reaction to occur to a significant degree. Temperatures below this temperature tend to result in incomplete reaction of the sodium containing waste material with the silica bearing material. Combustion is preferably carried out at a temperature between about 700° to about 1200° C.

The sodium containing waste material and the silica bearing material can be combusted in any standard incinerator having at least a portion of the inner walls lined with a refractory material.

The refractory materials employed in the practice of the present invention are any of various nonmetallic ceramic substances that are characterized by their suitability for use as structural materials at high temperature and which tend to react with free sodium and deteriorate. It is believed that deterioration is caused by the production of newly formed compounds which have a different coefficient of expansion and density than the refractory material. Upon cycling through temperature ranges, defects such as spalling, cracking and/or incursions are created in the refractory surface.

Since it is believed that the sodium containing waste materials tend to react with silica and/or alumina, the present invention is particularly directed to incinerators wherein the refractory material has a substantial content of silica and/or alumina. It has been found that sodium containing waste material tends to deteriorate refractory material having as little as 5% weight percent silica and/or alumina. Examples of refractory materials which contain substantial amounts of silica and/or alumina are refractory materials sold under the following Trademarks and having the weight percentages of alumina and silica indicated: Super Castable #32 (57.87 alumina, 35.15 silica); Zircon (traces alumina, 33.86 silica); Chemal (83.93 alumina, 9.04 silica); Mullitex (40.36 alumina, 54.70 silica); Kemram 1 (about 21.5 alumina, about 2.5 silica); Castable 141A (about 96.5 alumina, about 0.25 silica); Moldit Chrome (about 31 alumina, 5 silica); Blu-Ram H.S. (about 72.5 alumina, about 20.5 silica) and W.A.S.P. 60 (about 50 alumina, about 39 silica); all available from CE Refractories, Ltd., a division of Combustion Engineering, Inc.

FIG. 1 shows a schematic of a type of incinerator which may be used in the present invention. Incinerator 1 is lined with refractory walls 2 within which the sodium containing waste material and the silica bearing waste material are combusted. Incinerator 1 is a downfired type having burner 3 which may be fueled by a conventional energy source, such as oil or natural gas. The aqueous sodium containing waste material and the silica bearing material are mixed by mixer 4 and are introduced into incinerator 1 through nozzle 5. It should be understood that more than one nozzle can be used to introduce the mixture in incinerator 1. During combustion the mixture of the sodium containing waste material and the silica bearing material are exposed to and in contact with refractory walls 2. During combustion, free sodium produced by the sodium containing waste material has an affinity for silica, and since the silica bearing material is readily available for reaction, it is believed that the sodium in the sodium containing waste material will preferentially react with the silica in the silica bearing material, thus reducing the degree to which the silica and/or the alumina in refractory walls 2 reacts with the free sodium.

It should be understood that incinerator 1 may have portions of the exposed internal walls lined with more than one type of refractory material. Also, a portion of the exposed interior walls 6 may be of a material other than refractory material.

Combustion products containing sodium silicates can be removed from the incinerator 1 in any conventional manner. FIG. 1 shows, as one method of removal, a quench tank 7 wherein the combustion products including sodium silicates are cooled and removed from incinerator 1.

Figure 2:
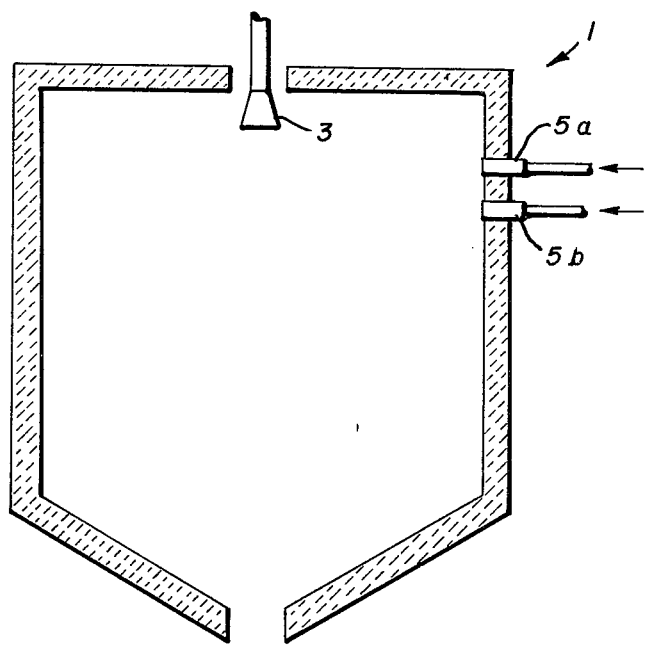
FIG. 2 shows a schematic of an alternative embodiment of an incinerator used in the present invention.

FIG. 2 shows an alternative method and apparatus for introducing the sodium containing material and the silica bearing material into incinerator 1. Rather than premixing the sodium containing waste material and the silica bearing material prior to introduction into incinerator 1, as was done by the method and apparatus shown in FIG. 1, the sodium containing material and the silica bearing material can be introduced into incinerator 1 separately and simultaneously through nozzles 5A and 5B shown in FIG. 2.

Another method of collecting and accumulating the resultant combustion product containing sodium silicate is to let the combustion product form on the refractory walls, and then periodically expose the coated refractory walls to a higher operating temperature utilizing a nonsodium bearing fuel to elevate the temperature in the incinerator to a point where the sodium silicate on the refractory walls melts and flows down the walls of the refractory into an open drain.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for disposal of sodium containing waste material comprising:
    (a) simultaneously introducing sodium containing waste material and silica bearing material into an incinerator, at least a portion of the incinerator being lined with a refractory material which tends to react with free sodium and deteriorate, the ratio by weight of the sodium and silica in the thus introduced materials being in the range of 0.4 to 0.8;
    (b) combusting the sodium containing waste material and silica bearing material to provide a combustion product including a sodium silicate compound whereby deterioration of refractory materials in the incinerator by reaction with free sodium is reduced.

2. A method according to claim 1 wherein combustion is carried out at a temperature of about 700° to about 1200° C.

3. A method according to claim 1 wherein the sodium containing waste material is added in an aqueous mixture.

4. A method according to claim 1 wherein the sodium containing waste material and the silica bearing material are premixed prior to introduction in the incinerator.

5. A method according to claim 4 wherein the sodium containing waste material includes sodium chloride.

6. A method according to claim 5 wherein the silica bearing materials are selected from the group consisting of silica flour, silica fume, pulverized silica sand, organic materials containing silica.

7. A method according to claim 6 wherein said organic materials are rice hulls.

8. A method for the simultaneous disposal of sodium containing waste material and rice hulls comprising:
    (a) simultaneously introducing a sodium containing waste material and rice hulls which have not been subjected to a prior chemical treatment into an incinerator, the interior exposed wall of the incinerator being at least in part lined with a refractory material which tends to react with free sodium and deteriorate; and
    (b) combusting the sodium containing waste material and the rice hulls to provide a combustion product including a sodium silicate compound, the combustion being carried out to reduce deterioration of the refractory material by reaction with free sodium, said rice hulls providing a portion of the combustion energy.

9. A method according to claim 8 wherein the combustion is carried out at a temperature of about 700° to about 1200° C.

10. A method according to claim 8 wherein said rice hulls are introduced in an aqueous mixture.

11. A method according to claim 10 wherein said sodium containing waste material contains sodium chloride.

12. A method according to claim 11 wherein the weight ratio of sodium to silica is from about 0.4 to about 0.8.

13. A method for disposal of black liquor comprising:
    (a) mixing black liquor comprising:
        (1) about 5 to about 15 weight percent NaCl,
        (2) traces to about 1 weight percent NaOH,
        (3) traces to about 1 weight percent $Na_2SO_4$,
        (4) traces to about 1 weight percent $Na_2SO_3$,
        (5) traces to about 10 weight percent organics, and
        (6) about 75 to about 95 weight percent water,
        with a silica bearing material in a weight ratio range of sodium to silica or about 0.4 to about 0.8; and
    (b) combusting said (a) mixture to provide a combustion product comprising a sodium silicate compound.

14. A method according to claim 1 wherein the silica bearing materials are selected from the group consisting of silica flour, silica fume, pulverized silica sand and organic materials containing silica.

15. A method according to claim 14 wherein said organic materials are rice hulls.

* * * * *